United States Patent
Lee

(10) Patent No.: US 8,604,746 B2
(45) Date of Patent: Dec. 10, 2013

(54) CONTACTLESS POWER CHARGING SYSTEM AND ENERGY STORAGE SYSTEM INCLUDING THE SAME

(75) Inventor: Woog-Young Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 388 days.

(21) Appl. No.: 12/929,580

(22) Filed: Feb. 2, 2011

(65) Prior Publication Data
US 2011/0291606 A1    Dec. 1, 2011

(30) Foreign Application Priority Data
May 31, 2010   (KR) .................. 10-2010-0051440

(51) Int. Cl.
*H01M 10/46*    (2006.01)
(52) U.S. Cl.
USPC .......................................................... 320/101
(58) Field of Classification Search
USPC .................. 320/101, 107, 108, 109, 114, 115
See application file for complete search history.

(56) References Cited

U.S. PATENT DOCUMENTS

| | | | |
|---|---|---|---|
| 6,075,433 A | 6/2000 | Ono et al. | |
| 6,525,510 B1 | 2/2003 | Ayano et al. | |
| 2008/0296979 A1* | 12/2008 | Kato et al. | 307/104 |

FOREIGN PATENT DOCUMENTS

| | | |
|---|---|---|
| JP | 2003-061266 A | 2/2003 |
| JP | 2007-028727 A | 2/2007 |
| JP | 2008-112913 A | 5/2008 |
| JP | 2008-235782 A | 10/2008 |
| KR | 10 1999-022129 A | 3/1999 |
| KR | 10 2003-0026832 A | 4/2003 |
| KR | 10-2006-0076796 A | 7/2006 |
| KR | 10-0634084 B1 | 10/2006 |
| KR | 10 2007-0071307 A | 7/2007 |
| KR | 10 2007-0094114 A | 9/2007 |

OTHER PUBLICATIONS

Korean Office Action in KR 10-2010-0051440, dated Feb. 29, 2012 (Lee).

* cited by examiner

*Primary Examiner* — Edward Tso
(74) *Attorney, Agent, or Firm* — Lee & Morse, P.C.

(57) ABSTRACT

A contactless power charging system and an energy storage system including the same, the contactless power charging system including a contactless transformer configured to transmit power stored in a battery to a load, wherein the contactless transformer includes a primary core unit, the primary core unit including a first base portion, a projecting portion projecting from the first base portion, and a primary coil wound around the projecting portion; and a secondary core unit, the secondary core unit including a second base portion, a concave portion in the second base portion to receive the projecting portion, and a secondary coil on an inner surface of the concave portion, the secondary coil being configured to couple to the primary coil.

19 Claims, 7 Drawing Sheets

CONTACTLESS POWER CHARGING SYSTEM AND ENERGY STORAGE SYSTEM INCLUDING THE SAME

BACKGROUND

1. Field

Embodiments relate to a contactless power charging system and an energy storage system including the same.

2. Description of the Related Art

As environmental contamination and resource exhaustion have increased, the importance of renewable energy, e.g., solar energy, has also increased. Recently, electric cars have been spotlighted as a next-generation means of transportation because of, e.g., low $CO_2$ emission.

SUMMARY

Embodiments are directed to a contactless power charging system and an energy storage system including the same, which substantially overcome one or more of the problems due to the limitations and disadvantages of the related art.

It is a feature of an embodiment to provide a contactless power charging system using a contactless transformer that reduces a leakage component generated during power transmission of the contactless power charging system and reduces leakage inductance that may occur depending on a gap.

It is another feature of an embodiment to provide a contactless power charging system using a transformer and an energy storage system for transmitting power to a battery included in the energy storage system in a contactless manner to charge a load.

At least one of the above and other features and advantages may be realized by providing a contactless power charging system including a contactless transformer configured to transmit power stored in a battery to a load, wherein the contactless transformer includes a primary core unit, the primary core unit including a first base portion, a projecting portion projecting from the first base portion, and a primary coil wound around the projecting portion; and a secondary core unit, the secondary core unit including a second base portion, a concave portion in the second base portion to receive the projecting portion, and a secondary coil on an inner surface of the concave portion, the secondary coil being configured to couple to the primary coil.

The contactless power charging system may further include a gap between the first coil and the secondary coil.

The contactless power charging system may further include an inverter configured to convert power of the battery into alternating current (AC) power and transmit the AC power to the primary core unit; and a first capacitor connected to the inverter and connected in series to the primary core unit.

The contactless power charging system may further include a second capacitor connected in parallel to the secondary core unit.

The contactless power charging system may further include a rectifying unit, the rectifying unit being configured to rectify power transmitted from the secondary core unit and to transmit the rectified power to the load.

The secondary core unit may have a box shape.

The load may be a battery of an electrical moving object.

The secondary core unit may be on the electrical moving object.

At least one of the above and other features and advantages may also be realized by providing an energy storage system for converting power generated by a photovoltaic power generation system and supplying the converted power to a grid or a load or storing the converted power in a battery, supplying power supplied from the grid to the load or converting the supplied power and storing the converted power in the battery, and converting power stored in the battery and supplying the converted power to the grid or the load, the energy storage system including a contactless power charging system configured to charge a battery of an electrical moving object with the power stored in the battery by using a contactless transformer.

The contactless transformer may include a primary core unit, the primary core unit including a first base portion, a projecting portion projecting from the first base portion, and a primary coil wound around the projecting portion; and a secondary core unit, the secondary core unit including a second base portion, a concave portion in the second base portion to receive the projecting portion, and a secondary coil on an inner surface of the concave portion, the secondary coil being configured to couple to the primary coil.

The contactless power charging system may include an inverter, the inverter being configured to convert power of the battery into alternating current (AC) power and to transmit the AC power to the primary core unit; and a first capacitor connected to the inverter and connected in series to the primary core unit.

The energy storage system may further include an integrated controller configured to control power conversion of the energy storage system, wherein the integrated controller is configured to control a switching frequency of the inverter based on a resonance frequency of the first capacitor connected in series to the primary core unit.

The contactless power charging system may further include a second capacitor connected in parallel to the secondary core unit.

The contactless power charging system may further include a rectifying unit, the rectifying unit being configured to rectify power transmitted from the secondary core unit and to transmit the rectified power to the load.

The secondary core unit may be on the electrical moving object.

The inverter may have a full-bridge structure including at least 4 switching elements.

At least one of the above and other features and advantages may also be realized by providing an energy storage system including a maximum power point tracking (MPPT) converter configured to convert power generated by a photovoltaic power generation system and to output the converted power to a first node; a bidirectional inverter connected between the first node and a second node to which a grid and a load are connected, the bidirectional inverter being configured to convert a first power input through the first node into a second power and output the second power to the second node, and convert power supplied from the grid into the first power and output the first power to the first node; a battery configured to store a third power; a bidirectional converter connected between the battery and the first node, the bidirectional converter being configured to convert the third power output from the battery into the first power and output the first power to the bidirectional inverter through the first node, and convert the first power output through the first node from the bidirectional inverter into the third power and store the third power in the battery; an inverter configured to convert the third power stored in the battery into a fourth power; a primary core unit configured to transmit the fourth power to a battery of an electrical moving object in a contactless manner, the electrical moving object including a secondary core unit; and an integrated controller configured to control power conversion of the MPPT converter, the bidirectional inverter, the bidirectional converter, and the inverter.

The primary core unit may include a first base portion, a projecting portion projecting from the first base portion, and a primary coil wound around the projecting portion, and the secondary core unit may include a second base portion, a concave portion in the second base portion to receive the projecting portion, and a secondary coil on an inner surface of the concave portion, the secondary coil being configured to couple to the primary coil.

The energy storage system may further include a first capacitor connected between the inverter and the primary core unit and connected in series to the primary core unit, wherein the electrical moving object further includes a second capacitor connected in parallel to the secondary core unit.

The electrical moving object may further include a rectifying unit, the rectifying unit being configured to rectify power transmitted from the secondary core unit and to transmit the rectified power to the battery.

At least one of the above and other features and advantages may also be realized by providing a contactless power charging apparatus including a primary core unit, the primary core unit including a first base portion, a projecting portion projecting from the first base portion, and a primary coil wound around the projecting portion.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
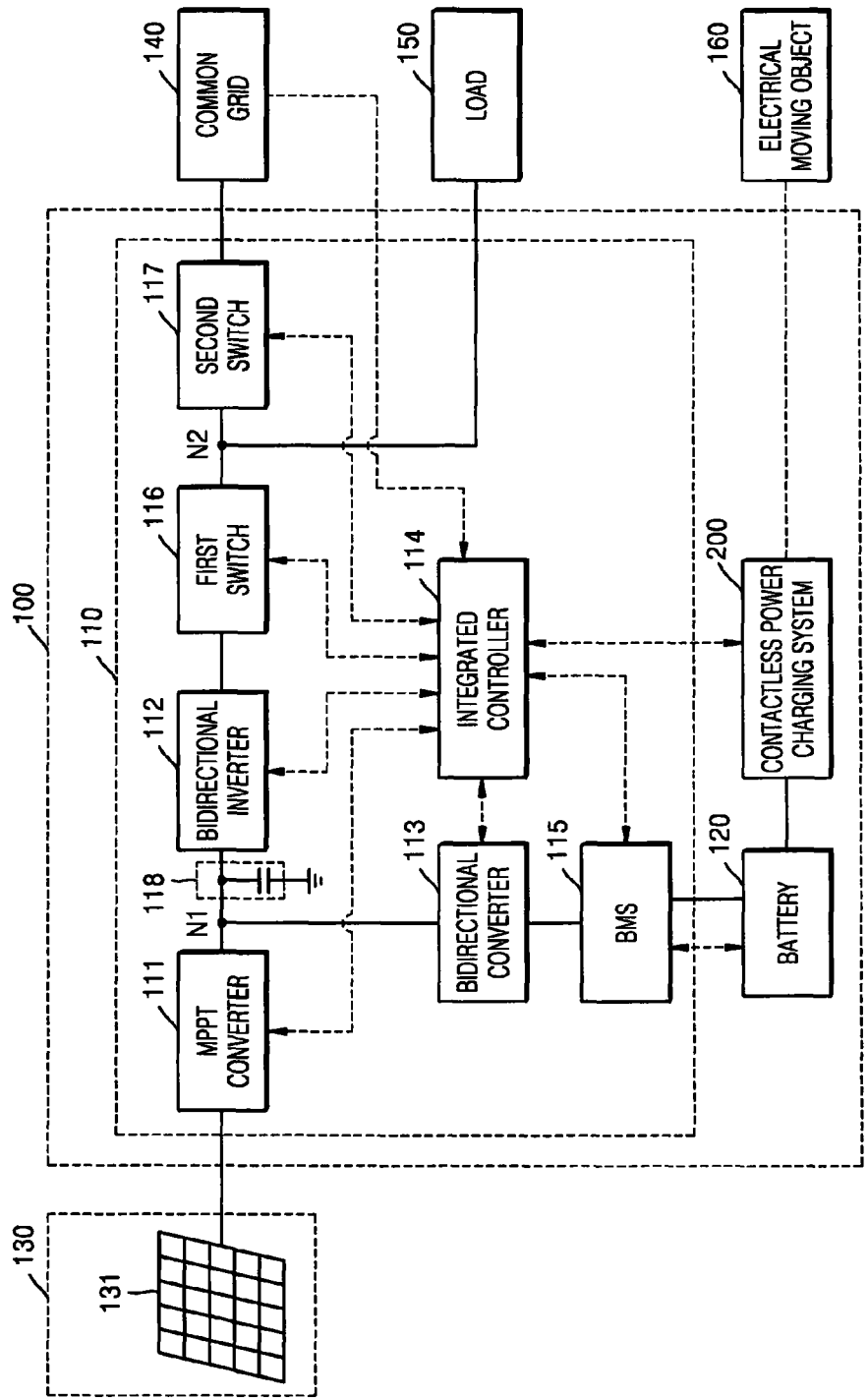
FIG. 1 illustrates a block diagram of an energy storage system including a contactless power charging system, according to an embodiment.

Korean Patent Application No. 10-2010-0051440, filed on May 31, 2010, in the Korean Intellectual Property Office, and entitled: "Contactless Power Charging System and Energy Storage System Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, the embodiments will be explained in detail with reference to the attached drawings. In the following description, only essential parts necessary to understand operation of the embodiments will be explained and other parts will not be explained when it is deemed that they make the subject matter of the embodiments unnecessarily obscure.

Also, terms or words used in the specification and the appended claims should not be construed as being confined to common or dictionary meaning, but should be construed as concepts matching the technical spirit of the present invention in order to describe the present invention in the best fashion. In particular, the terms noncontact, contactless, wireless, and the like used throughout the specification should be construed as having the same meaning, and the terms electric power, power supply, and power, should be construed as having the same meaning.

FIG. 1 illustrates a block diagram of an energy storage system 100, which may be a grid-connected energy storage system, according to an embodiment.

Referring to FIG. 1, a power management system 110 may include a maximum power point tracking (MPPT) converter 111, a bidirectional inverter 112, a bidirectional converter 113, an integrated controller 114, a battery management system (BMS) 115, a first switch 116, a second switch 117, and a direct current (DC) link unit 118. The power management system 110 may be connected to a battery 120, a power generation system 130, e.g., a photovoltaic (PV) power generation system including solar cells 131, a grid 140, and a load 150. Although the energy storage system 100 may be configured to include the power management system 110 and the battery 120, as illustrated in FIG. 1, the present embodiment is not limited thereto; and the energy storage system 100 may be a power management system or a grid-connected energy storage system in which the power management system 110 and the battery 120 are integrated.

The power generation system 130 may generate electrical energy and may output the electrical energy to the power management system 110. Although the power generation system 130 may include solar cells 131, as illustrated in FIG. 1, the power generation system 130 is not limited thereto, and alternatively may include, e.g., a wind power generation system or a tidal power generation system. In addition, examples of the power generation system 130 may include all power generation systems for generating electrical energy by using renewable energy such as solar heat or geothermal heat. The solar cells 131 for generating electrical energy by using sunlight may be easily installed on a house or a factory and thus may be appropriate for application to the energy storage system 100 of a house.

The grid 140 may include a power plant, a substation, power transmission cables, and the like. During normal operation of the grid 140, the grid 140 may supply power to the storage device 120 or the load 150 or may receive power supplied from the power generation system 130 or the battery 120, according to a switching condition of the first switch 116 and the second switch 117. When operation of the grid 140 is abnormal, e.g., due to a blackout, electric work, or the like, the power supply from the grid 140 to the battery 120 or the load 150 may be stopped; and the power supply from the power generation system 130 or the battery 120 to the grid 140 may also be stopped.

The load 150 for consuming power generated from the power generation system 130, power stored in the battery 120, or power supplied from the grid 140 may include, e.g., a house or a factory. The following explanation is based on an example in which the power generation system 130 is a solar power generation system.

The MPPT converter 111 may convert a DC voltage output from the solar cells 131 into a DC voltage to be input to a first node N1. Since the output of the solar cells 131 may vary according to a load condition and climate change in terms of insolation and temperature, the MPPT converter 111 may control the solar cells 131 to generate maximum power. For example, the MPPT converter 111 may function as a DC-DC converter for outputting a desired DC voltage by boosting a DC voltage from the solar cells 131 and also as an MPPT controller. For example, a DC voltage output from the MPPT converter 111 may be from about 300 to about 600 V. Also, the MPPT converter 111 may perform MPPT control for tracking a maximum power output voltage of the solar cells 131 according to a change in, e.g., insolation, temperature, etc. For example, the MPPT control may include perturbation and observation (P&O) control, incremental conductance (IncCond) control, and power to voltage control. The P&O control may involve increasing or decreasing a reference voltage by measuring power and a voltage of the solar cells 131. The IncCond control may involve comparing and controlling output conductance and incremental conductance of the solar cells 131. The power to voltage control may involve controlling a power to voltage gradient. However, the MPPT control is not limited thereto and may also include another suitable type of MPPT control.

The DC link unit 118 may be connected in parallel between the first node N1 and the bidirectional inverter 112. The DC link unit 118 may maintain the DC voltage output from the MPPT converter 111 as a DC link voltage, e.g., 380 V DC; and may supply the DC link voltage to the bidirectional inverter 112 or the bidirectional converter 113. The DC link unit 118 may include, e.g., an electrolytic capacitor, a polymer capacitor, or a multilayer ceramic capacitor (MLCC). The first node N1 may have an unstable voltage level due to, e.g., a change in the DC voltage output from the solar cells 131, a sudden voltage sag on the grid 140, a peak load of the load 150, or the like. Accordingly, the DC link unit 118 may provide a stable DC link voltage so as to normally operate the bidirectional converter 113 and the bidirectional inverter 112. Although the DC link unit 118 may be a separate element, as illustrated in FIG. 1, in an implementation, the DC link unit 118 may be included in the bidirectional converter 113, the bidirectional inverter 112, or the MPPT converter 111.

The bidirectional inverter 112 may be connected between the first node N1 and the grid 140. The bidirectional inverter 112 may convert a DC voltage output from the MPPT converter 111 or the bidirectional converter 113 into an alternating current (AC) voltage to be input to the grid 140 or the load 150. Or, the bidirectional inverter 112 may convert an AC voltage supplied from the grid 140 into a DC voltage so as to provide the DC voltage to the first node N1. That is, the bidirectional inverter 112 may function as an inverter for converting a DC voltage into an AC voltage and also as a rectifier for converting an AC voltage into a DC voltage.

The bidirectional inverter 112 may rectify an AC voltage input from the grid 140 through the first switch 116 and the second switch 117 into a DC voltage, may output the DC voltage to be stored in the battery 120 and may convert a DC voltage output from the power generation system 130 or the battery 120 into an AC voltage to be input to the grid 140. In this case, the AC voltage output to the grid 140 should satisfy a power quality standard of the grid 140, e.g., to have a power factor greater than 0.9 and a total harmonic distortion (THD) less than 5%. To this end, the bidirectional inverter 112 may prevent generation of reactive power by synchronizing a phase of an output AC voltage with a phase of the grid 140 and may control a level of the AC voltage. Also, the bidirectional inverter 112 may include a filter for removing harmonics from the AC voltage output to the grid 140 and may perform functions, e.g., voltage variation range restriction, power factor improvement, DC component removal, and transient phenomenon protection. The bidirectional inverter 112 of FIG. 1 may function as an inverter for converting DC power output from the power generation system 130 or the battery 120 into AC power to be supplied to the grid 140 or the load 150 and also as a rectifier for converting AC power supplied from the grid 140 into DC power to be supplied to the battery 120.

The bidirectional converter 113 may be connected between the first node N1 and the battery 120. The bidirectional converter 113 may convert a DC voltage output from the first node N1 into a DC voltage to be stored in the battery 120. Also, the bidirectional converter 113 may convert a DC voltage stored in the battery 120 into a DC voltage to be transmitted to the first node N1. For example, if DC power generated by the power generation system 130 or AC power supplied from the grid 140 is charged to the battery 120, i.e., in a battery charging mode, the bidirectional converter 113 may function as a converter for reducing a DC voltage level of the first node N1 or a DC link voltage level of the DC link unit 118, e.g., 380 V DC, into a voltage level in the battery 120, e.g., 100 V DC. Also, if power charged in the battery 120 is supplied to the grid 140 or the load 150, i.e., in a battery discharging mode, the bidirectional converter 113 may function as a converter for increasing a voltage level to be stored in the battery 120, e.g., 100 V DC, into a DC voltage level of the first node N1 or a DC link voltage level of the DC link unit 118, e.g., 380 V DC. The bidirectional converter 113 of FIG. 1 may convert DC power generated by the power generation system 130 or DC power converted from AC power supplied from the grid 130 into DC power to be stored in the battery 120 and may also convert DC power stored in the battery 120, which is to be input to the bidirectional inverter 112 and then supplied to the grid 140 or the load 150.

The battery 120 may store power supplied from the power generation system 130 or the grid 140. The battery 120 may be configured in such a manner that a plurality of battery cells are connected in series and/or in parallel to increase capacity and output. Charging or discharging of the battery 120 may be controlled by the BMS 115 and/or the integrated controller 114. The battery 120 may be any of various suitable batteries, e.g., a nickel-cadmium battery, a lead storage battery, a nickel metal hydride (NiMH) battery, a lithium ion battery, a lithium polymer battery, etc. The number of battery cells constituting the battery 120 may be determined based on, e.g., power capacity, design conditions, etc., required by the energy storage system 100.

The BMS 115 may be connected to the battery 120. The BMS 115 may control charging or discharging of the battery 120 under the control of the integrated controller 114. Discharge power from the battery 120 to the bidirectional converter 113 and charge power from the bidirectional converter 113 to the battery 120 may be transmitted through the BMS 115. Also, the BMS 115 may perform, e.g., overcharge protection, overdischarge protection, overcurrent protection, overheating protection, cell balancing, and the like, in order to protect the battery 120. To this end, the BMS 115 may calculate a state of charge (SOC) and a state of health (SOH) of the battery 120 by detecting a voltage, a current, and a temperature of the battery 120, and thus may monitor, e.g., a remaining power amount, a remaining lifetime, and so on, of the battery 120.

The BMS 115 may include a sensor for detecting a voltage, a current, and a temperature of the battery 120, a micro computer for determining overcharge, overdischarge, overcurrent, cell balancing, an SOC, and an SOH based on a result of the detection, and a protection circuit for performing charging or discharging prevention, fuse breaking, cooling, or the like based on a control signal of the micro computer. Although the BMS 115 may be included in the power management system 110 and may be separated from the battery 120, as illustrated in FIG. 1, in an implementation, the BMS 115 and the battery 120 may be integrated with each other in a battery pack. Also, the BMS 115 may control charging or discharging of the battery 120 under the control of the integrated controller 114 and may transmit information about a charged power amount calculated by using state information of the battery 120, for example, the SOC, to the integrated controller 114.

The first switch 116 may be connected between the bidirectional inverter 112 and a second node N2. The second switch 117 may be connected between the second node N2 and the grid 140. The first switch 116 and the second switch 117 may be turned on or off under the control of the integrated controller 114. The first switch 116 and the second switch 117 may supply or block power from the power generation system 130 or the battery 120 to the grid 140 or the load 150, or may supply or block power from the grid 140 to the load 150 or the battery 120. For example, if power generated by the power generation system 130 or power stored in the battery 120 is to be supplied to the grid 140, the integrated controller 114 may turn on the first and second switches 116 and 117. If power is to be supplied only to the load 150, the integrated controller 114 may turn on the first switch 116 and may turn off the second switch 117. Also, if power of the grid 140 is to be supplied to only the load 150, the integrated controller 114 may turn off the first switch 116 and may turn on the second switch 117.

If the grid 140 operates abnormally, e.g., in a blackout or during repair work on a power cable, the second switch 117 may block power supply to the grid 140 under the control of the integrated controller 114 so that only the energy storage system 100 operates (hereinafter, referred to as "sole operation"). In this case, the integrated controller 114 may prevent a short-distance access accident, such as an electric shock of a cable maintenance or repair man who accesses the grid 140 or may prevent the grid 140 from adversely affecting electrical equipment, by separating the power management system 110 from the grid 140. In addition, if the grid 140 recovers from the abnormal operation while power generated by the power generation system 130 or power stored in the battery 120 is supplied to the load 150 in the sole operation, a phase difference may occur between a voltage output from the grid 140 and a voltage output from the battery 120 in the sole operation. Thus, the power management system 110 may be damaged. Accordingly, in order to prevent damage to the power management system 110, the integrated controller 114 may initiate the sole operation when the grid operates abnormally.

A contactless power charging system 200 of the energy storage system 100 may transmit power stored in the battery 120 to a battery of an electrical device, e.g., an electrical moving object 160, by using a contactless transformer. The electrical moving object 160 may include, e.g., a hybrid automobile, an electrical car, an electrical bicycle, or the like. However, in an implementation, examples of the electrical moving object 160 may include any suitable battery-powered electrical moving body. The energy storage system 100 including the contactless power charging system 200 in FIG. 1 may be located, e.g., in a house, and the electrical moving object 160 may be located in a parking area of the house where the battery of the electrical moving object 160 may be charged. For example, the battery of the electrical moving object 160 may be charged by providing a primary core for transmitting power of the contactless power charging system 200, e.g., in a floor of the parking area, and providing a secondary core for receiving power of the contactless power charging system 200, e.g., in a bottom of the electrical moving object 160. In another implementation, both the primary core for transmitting power and the secondary core for receiving power may be included in the contactless power charging system 200; and only a charging interface may be included in the electrical moving object 160.

The contactless transformer may be a noncontact or contactless transformer in which a primary core for transmitting power and a secondary core for receiving power are separated from each other with a predetermined gap maintained therebetween. A contactless charging method using the contactless transformer may have an advantage in that, in contrast to a contact charging method that has a risk of causing a blackout on a humid or rainy day, the contactless charging method may not cause a blackout. Also, as a number of times the contact charging method is used increases, a risk of poor contact may likewise increase and charging may be performed only when both terminals exactly contact each other. However, even though the number of times the contactless charging method is used increases, poor contact may not occur and charging may be easily performed.

The configuration of the contactless power charging system 200 will be explained in detail with reference to FIG. 2.

The integrated controller 114 may control overall operation of the power management system 110 and/or the energy storage system 100. In order to improve power conversion efficiency and reduce switching loss of the contactless power charging system 200, the integrated controller 114 of FIG. 1 may control a switching frequency. That is, the integrated controller 114 may control power conversion efficiency by sensing a resonance frequency of the contactless power charging system 200 and applying an inverter control signal, corresponding to a switching frequency corresponding to the resonance frequency, to a gate electrode of a switching element.

Figure 2:
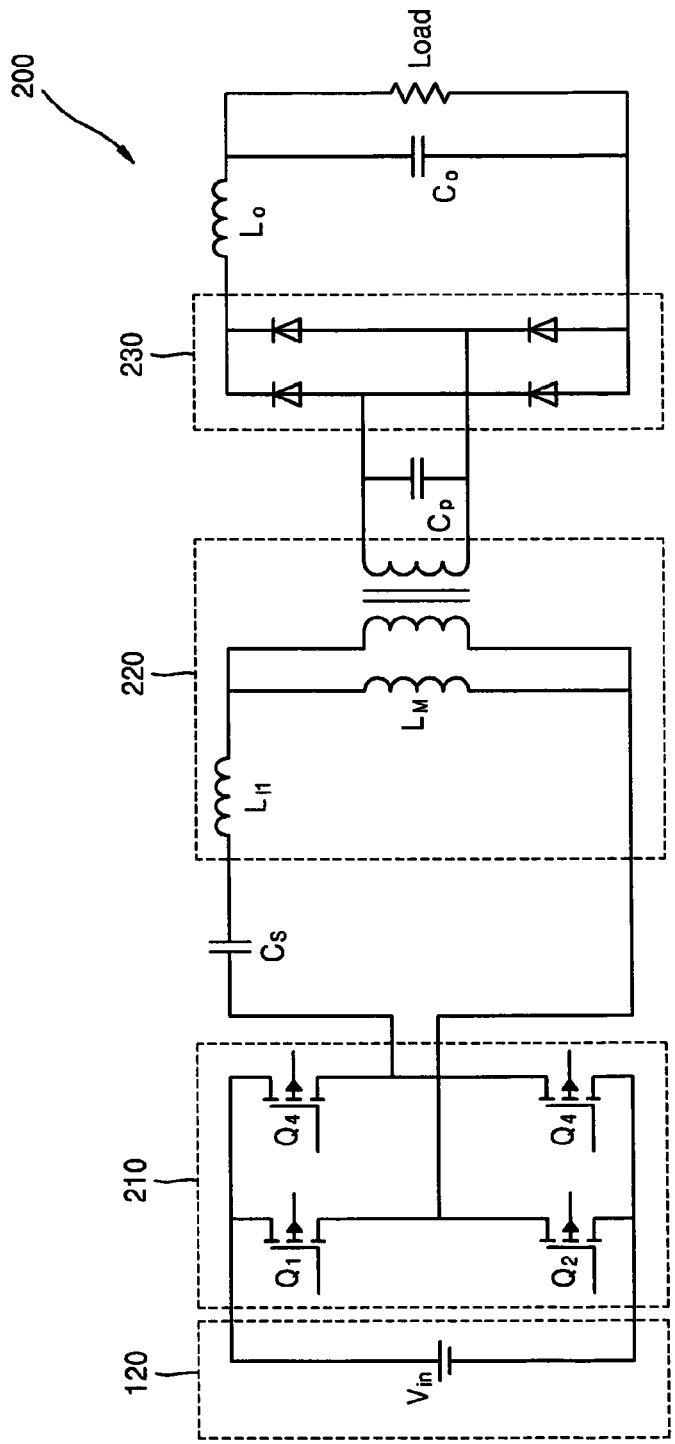
FIG. 2 illustrates a diagram of the contactless power charging system of the energy storage system of FIG. 1.

FIG. 2 illustrates a block diagram of the contactless power charging system 200 of the energy storage system 100 of FIG. 1, according to an embodiment.

Referring to FIG. 2, the contactless power charging system 200 may include an inverter 210, a contactless transformer 220, and a rectifying unit 230. A capacitor $C_S$ may be connected in series between the inverter 210 and a primary core of the contactless transformer 220. A capacitor $C_P$ may be connected in parallel between a secondary core of the contactless transformer 220 and the rectifying unit 230. The battery 120 may be a power storage element included in the energy storage system 100 of FIG. 1, e.g., a DC power source for converting power supplied from the power generation system 130 or a common power source into 100 V DC through the MPPT converter 111, the bidirectional inverter 112, and the bidirectional converter 113 and for storing 100 V DC therein.

The inverter 210 may switch the DC power stored in the battery 120 into AC power and may transmit the AC power to the contactless transformer 220. In an implementation, the inverter 210 may be configured to have a full-bridge structure including 4 switching elements Q1 through Q4. However, the embodiments are not limited thereto; and the inverter 210 may be configured to have, e.g., a half-bridge structure or a push-pull structure, or may be configured to include 4 or more switching elements. The switching elements may be insulated gate bipolar transistors (IGBTs) and may be suitable for high power fast switching. However, the embodiments are not limited to the IGBTs; and MOSFETs may be used as the switching elements. Although not illustrated in FIG. 2, a switching control signal may be input from an external control unit, e.g., the integrated controller 114 illustrated in FIG. 1, to gate electrodes of the switching elements Q1 through Q4. The integrated controller 114 may sense a resonance frequency of the primary core unit of the contactless transformer 220 and may switch the switching elements by enabling a switching frequency to match the resonance frequency that varies according to a gap of the contactless transformer 220, thereby reducing switching loss of the inverter 210.

The contactless transformer 220 may transmit power, which is obtained by transforming the AC power transmitted from the inverter 210 according to a turn ratio of the primary core unit and the secondary core unit, to the rectifying unit 230.

In general, a contactless transformer may have greater leakage inductance than a contact transformer. The term leakage inductance refers to inductance caused when a magnetic flux due to current flowing through the primary and secondary coils of the contactless transformer 220 is not linked to both the coils but is linked to one or part of the coils, due to a leakage flux not contributing to electromagnetic coupling between the coils. Accordingly, an amount of loss due to the leakage inductance may be increased, efficiency may be reduced, inductance at the primary side depending on a gap may change, and a resonance frequency may vary. Accordingly, it may be important to reduce a leakage component generated during power transmission through the contactless transformer. Also, exciting inductance of a core may be mostly affected by a size of the gap; and leakage inductance may vary depending on a shape of a coil. However, in general, a core used in the contactless transformer, e.g., an EE type core, or a "⊏ ⊣" type core, may have a large gap and leakage inductance of a primary coil and a secondary coil may be drastically increased when the gap is increased.

The contactless transformer 220 according to an embodiment will now be explained with reference to FIGS. 3A and 3B.

Figure 3A:
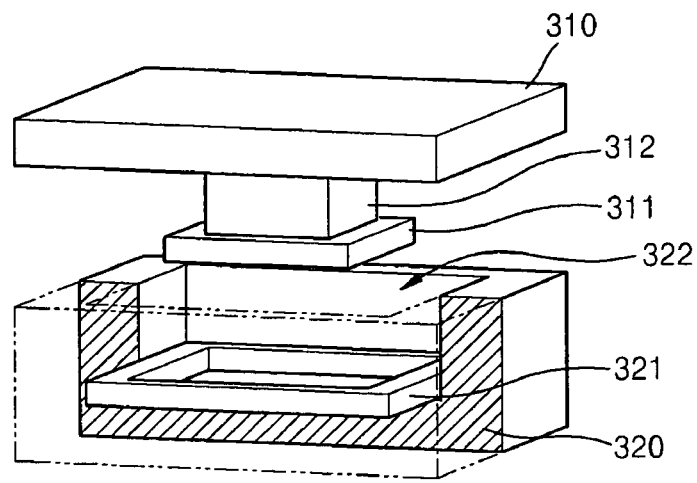
FIGS. 3A and 3B illustrate perspective views of a contactless transformer of the contactless power charging system of FIG. 2.

Referring to FIG. 3A, the primary core unit may include a first base portion 310, a projecting portion 312 projecting from a center of the first base portion 310, and a primary coil 311 wound around the projecting portion 312. The secondary core unit may include a second base portion 320, a concave portion 322 in the second base portion 320 to receive the projecting portion 312 of the primary core unit, and a secondary coil 321 on an inner surface of the concave portion 322 to be coupled to the primary coil 311. For example, the secondary core unit may have a box shape appropriate to receive the projecting portion 312 of the primary core unit. Although the primary core unit and the secondary core unit may have quadrangular or rectangular shapes, as illustrated in FIG. 3A, the embodiments are not limited thereto. The secondary coil 321 may be attached to the inner surface of the concave portion 322.

Figure 3B:
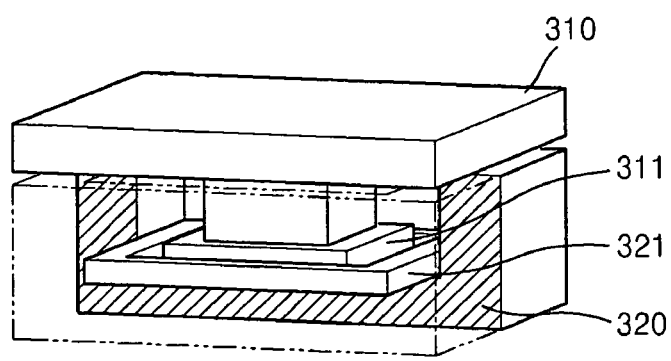

Referring to FIG. 3B, the primary core unit and the secondary core unit may be coupled to each other. Since the contactless transformer 220 may be configured such that the secondary core unit has a box shape and the primary core unit is disposed on the secondary core unit as if the primary core unit is a lid, only a center leg may be present in the primary core unit and may be surrounded by the secondary core unit. Since the contactless transformer 220 configured as described above may reduce a gap between the primary core unit and the secondary core unit, it may thus have less leakage inductance than a conventional transformer including a conventional EE type core or "⊏ ⊣" type core. Also, since the primary coil 311 and the secondary coil 322 may be coupled very close to each other, improved magnetic flux distribution may be achieved where the primary coil 311 and the secondary coil 322 are wound. Accordingly, the contactless transformer 220 of FIGS. 3A and 3B may have a shape with a small gap in order to reduce a leakage component generated during power transmission and may have better leakage and gap characteristics than a transformer including the conventional core because the contactless transformer 22 may have high magnetic flux density at a surface of and inside the core.

Referring back to FIG. 2, the rectifying unit 230 may rectify the power induced by the contactless transformer 220 and may transmit the rectified power to a load. Since the induced power is AC power, the rectifying unit 230 may convert the AC power into DC power and may charge the load, e.g., a battery of an electrical moving object, with the DC power.

The capacitor $C_S$ may be connected in series between the inverter 210 and the primary core of the contactless transformer 220. The capacitor $C_P$ may be connected in parallel between the secondary core of the contactless transformer 220 and the rectifying unit 230. In the present embodiment, the contactless power charging system 200 may include a series-parallel resonance circuit using a series resonance circuit at the primary core side and a parallel resonance circuit at the secondary core side. However, the embodiments are not limited thereto; and the contactless power charging system 200 may be configured to use either resonance circuit. By adding a resonance circuit to the inverter 210, a current or voltage output from the inverter 210 may be converted into a sine wave to reduce an amount of loss to almost zero (0).

The series resonance circuit may offset leakage impedance at the primary side through the capacitor $C_S$ connected in series to the primary coil of the primary core unit. The capacitor $C_P$ connected in parallel to the secondary coil of the secondary core unit may be used to achieve a constant output, irrespective of a change in the load at the secondary side. The series-parallel resonance circuit of the present embodiment may show a series resonance when a resistive load is short-circuited and may show a parallel resonance when the resistance load is opened. Accordingly, since impedance may be increased due to a parallel resonance of the capacitor connected in parallel at the secondary side and magnetizing inductance, a circulating current flowing under no load or low load while there is magnetizing inductance may be reduced, since there may be achieved a constant voltage gain at a standard resonance frequency regardless of a change in load resistance, frequency control may be carried out. In addition, since a current and a voltage of a resonance inverter of a contactless power source may be controlled to have almost the same phase in a full load range, reactive power may be reduced, thereby achieving high power conversion efficiency.

An inductor and a capacitor connected between the rectifying unit 230 and the load may maintain the DC voltage rectified by the rectifying unit 230 and may provide the maintained DC voltage to the load.

Figure 4A:
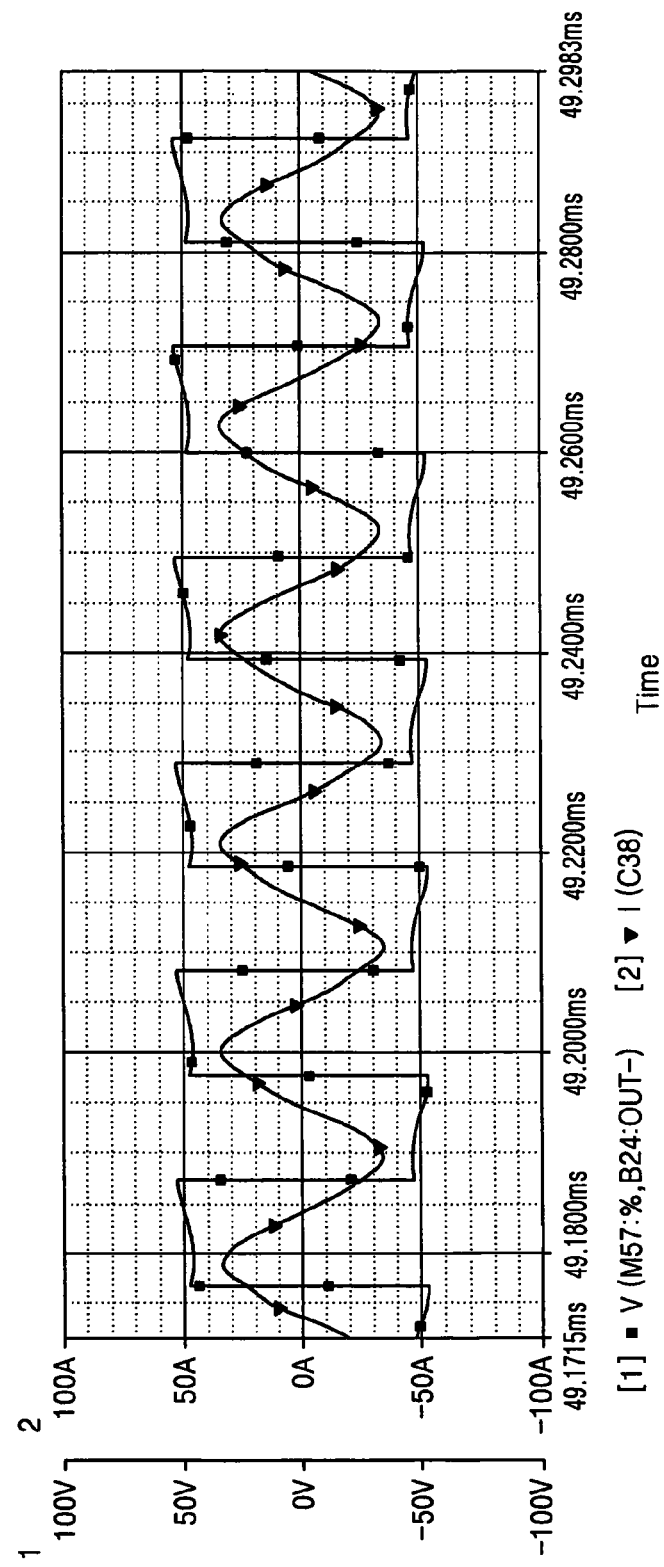
FIGS. 4A and 4B illustrate graphs showing results of a simulation performed on a conventional contactless power charging system.
Figure 4B:
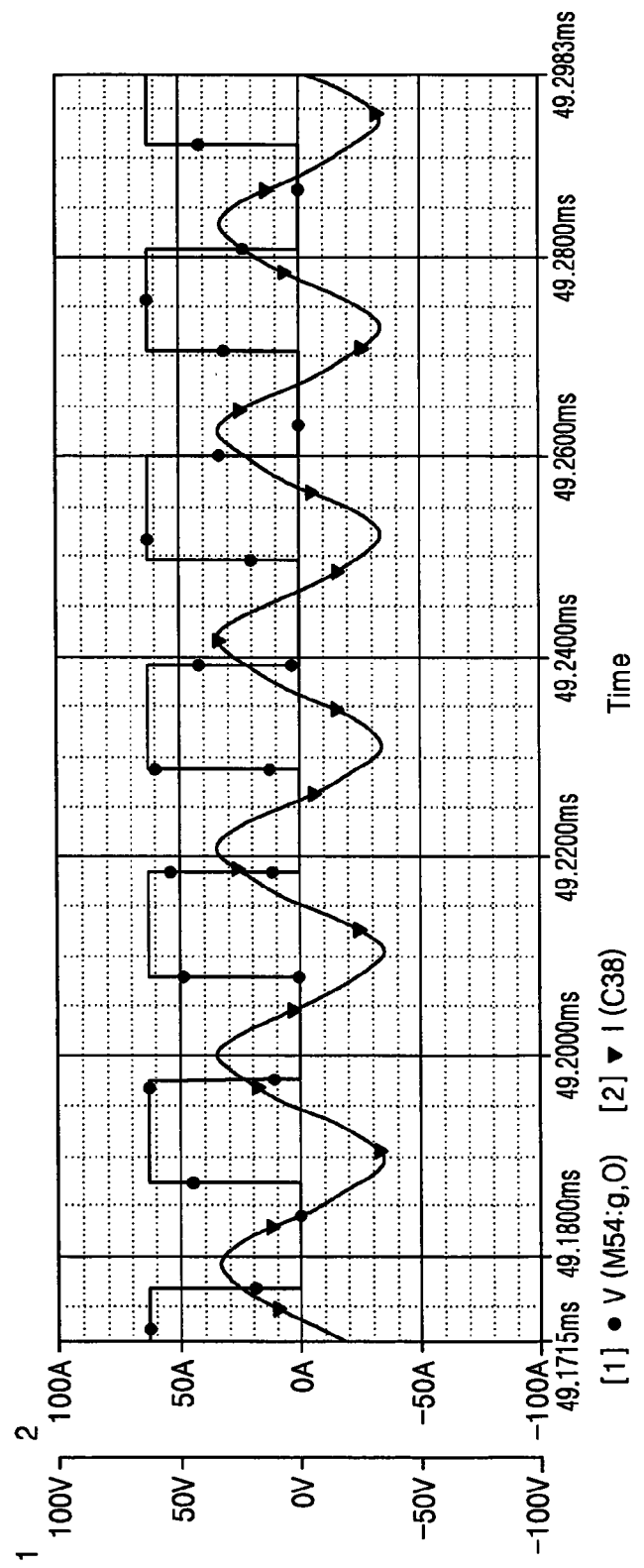

FIGS. 4A and 4B illustrate graphs showing results of a simulation performed on a conventional contactless power charging system.

FIG. 4A illustrates an output voltage of an inverter and a resonance current at a primary side. It may be seen that a resonance frequency varies according to a gap due to a contactless method of the conventional contactless power charging system. Accordingly, waveforms of a switching frequency and the resonance frequency do not match each other.

FIG. 4B illustrates a gate voltage and a resonance current. Since a gate voltage, i.e., a voltage applied to gates of switching elements of an inductor, does not match a resonance frequency, zero crossing switching (ZCS) is impossible and the amount of loss caused in a switch of the inductor may be high.

Figure 5A:
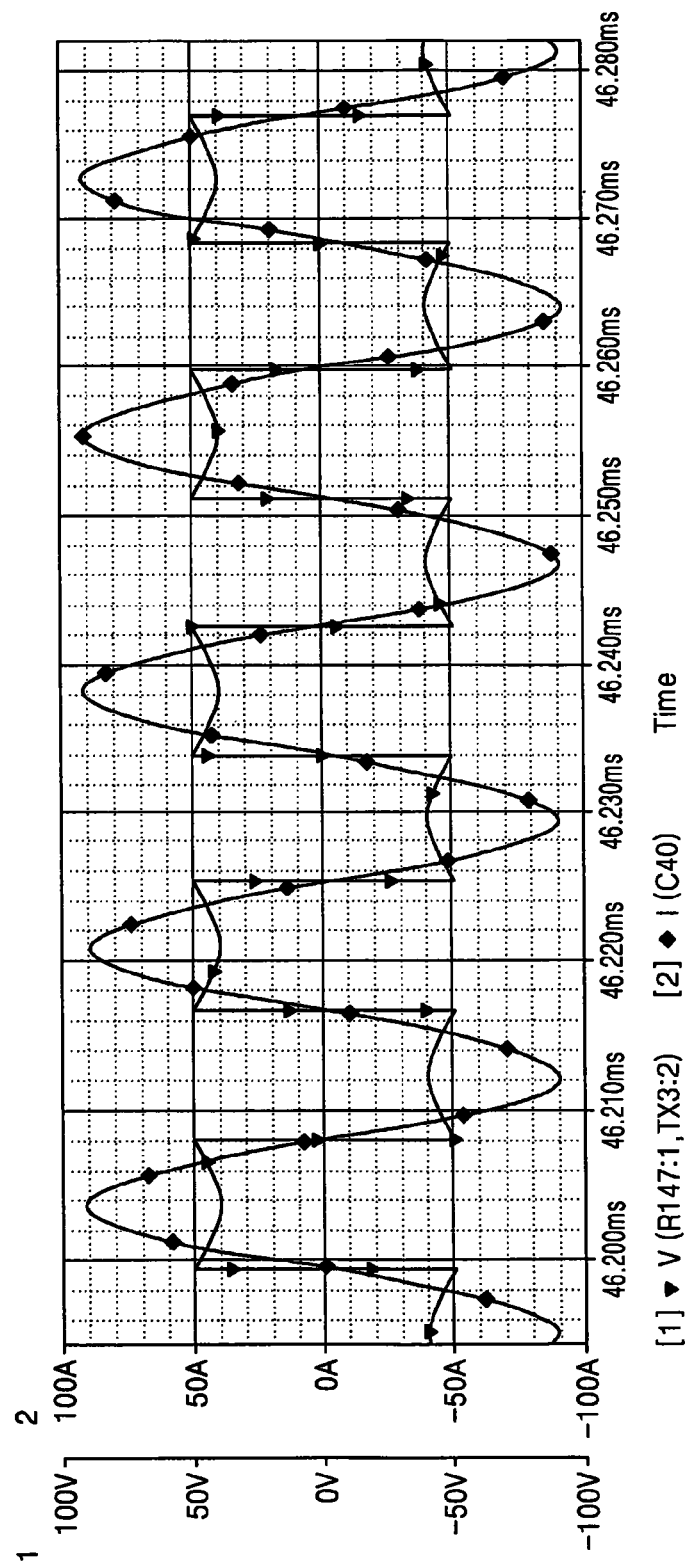
FIGS. 5A and 5B illustrate graphs showing results of a simulation performed on a contactless power charging system according to an embodiment.
Figure 5B:
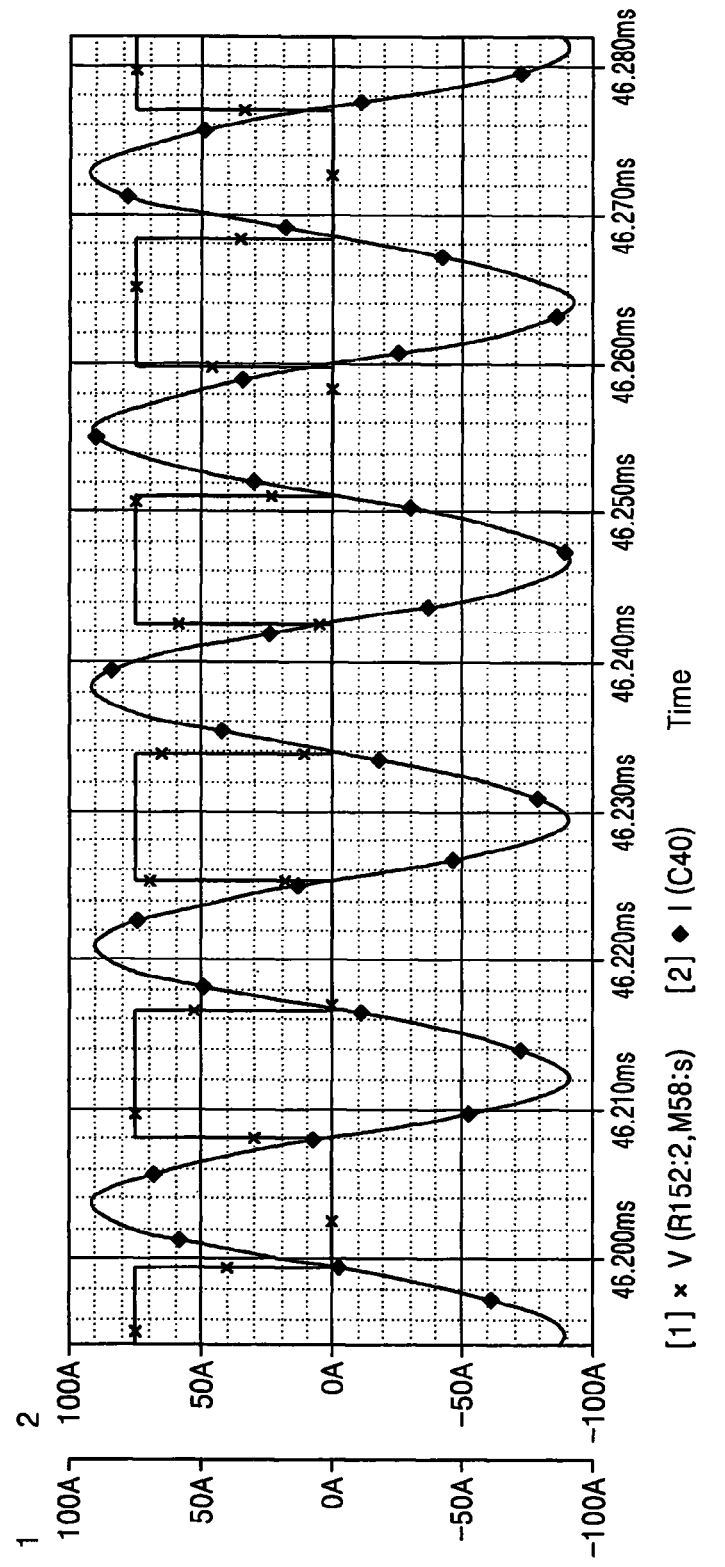

FIGS. 5A and 5B illustrate graphs showing results of a simulation performed on a contactless power charging system according to an embodiment.

FIG. 5A illustrates an output voltage of an inverter and a resonance current at a primary side. FIG. 5B illustrates a gate voltage and a resonance current.

Since a resonance frequency that varies according to a gap of a contactless transformer may be compensated for, as illustrated in FIG. 5A, the output voltage of the inverter and the resonance current may have the same phase. In addition, as shown in FIG. 5B, it may be seen from waveforms of the gate voltage and the resonance current that a switch is turned on or turned off where a current is 0. Accordingly, the amount of loss caused in the switch of the inductor may be reduced.

As described above, according to one or more of the above embodiments, since a contactless power charging system may use a contactless transformer having a shape that increases magnetic flux density and reduces a gap, a leakage component generated during power transmission in the contactless power charging system may be reduced, magnetic flux density at a surface of and inside of a core may be increased, and leakage and gap characteristics may be improved.

Also, a change in inductance at a primary side, depending on a gap of the contactless transformer, and a change in a resonance frequency due to the change in the inductance may be compensated for.

Since renewable energy, e.g., solar, wind, or tidal energy, is a natural unlimited resource and power generation using the renewable energy does not cause pollution, research into a method of using renewable energy has been actively conducted. In particular, as a system for optimizing energy efficiency by adding information technology to an existing power grid and bi-directionally exchanging information between a power supplier and a consumer, a smart grid system may be introduced.

However, it is necessary to repeatedly charge a power storage device installed therein. In order to popularize electric cars, infrastructure for charging batteries thereof should be expanded. In particular, research into wireless or contactless power charging systems for electric cars that may be charged while parked at home is being actively conducted Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A contactless power charging system, comprising:
   a contactless transformer configured to transmit power stored in a battery to a load, wherein the contactless transformer includes:
   a primary core unit, the primary core unit including a first base portion, a projecting portion projecting from the first base portion, and a primary coil wound at an end of the projecting portion; and
   a secondary core unit, the secondary core unit including a second base portion, a concave portion in the second base portion to receive the projecting portion, and a secondary coil on an inner surface of the concave portion, the secondary coil being configured to couple to the primary coil, and
   wherein:
   the projecting portion is between the primary coil and the base portion, and
   the secondary coil projects inwardly from the inner surface of the concave portion and surrounds the primary coil.

2. The contactless power charging system as claimed in claim 1, further comprising a gap between the first coil and the secondary coil.

3. The contactless power charging system as claimed in claim 1, further comprising:
   an inverter configured to convert power of the battery into alternating current (AC) power and transmit the AC power to the primary core unit; and
   a first capacitor connected to the inverter and connected in series to the primary core unit.

4. The contactless power charging system as claimed in claim 3, further comprising a second capacitor connected in parallel to the secondary core unit.

5. The contactless power charging system as claimed in claim 4, further comprising a rectifying unit, the rectifying unit being configured to rectify power transmitted from the secondary core unit and to transmit the rectified power to the load.

6. The contactless power charging system as claimed in claim 1, wherein the secondary core unit has a box shape.

7. The contactless power charging system as claimed in claim 1, wherein the load is a battery of an electrical moving object.

8. The contactless power charging system as claimed in claim 7, wherein the secondary core unit is on the electrical moving object.

9. An energy storage system for converting power generated by a photovoltaic power generation system and supplying the converted power to a grid or a load or storing the converted power in a battery, supplying power supplied from the grid to the load or converting the supplied power and storing the converted power in the battery, and converting power stored in the battery and supplying the converted power to the grid or the load, the energy storage system comprising:
   a contactless power charging system configured to charge a battery of an electrical moving object with the power stored in the battery by using a contactless transformer, wherein the contactless transformer includes:
   a primary core unit, the primary core unit including a first base portion, a projecting portion projecting from the first base portion, and a primary coil wound at an end of the projecting portion; and
   a secondary core unit, the secondary core unit including a second base portion, a concave portion in the second base portion to receive the projecting portion, and a secondary coil on an inner surface of the concave portion, the secondary coil being configured to couple to the primary coil, and
   wherein:
   the projecting portion is between the primary coil and the base portion, and the secondary coil projects inwardly from the inner surface of the concave portion and surrounds the primary coil.

10. The energy storage system as claimed in claim 9, wherein the contactless power charging system includes:
an inverter, the inverter being configured to convert power of the battery into alternating current (AC) power and to transmit the AC power to the primary core unit; and
a first capacitor connected to the inverter and connected in series to the primary core unit.

11. The energy storage system as claimed in claim 10, further comprising an integrated controller configured to control power conversion of the energy storage system, wherein the integrated controller is configured to control a switching frequency of the inverter based on a resonance frequency of the first capacitor connected in series to the primary core unit.

12. The energy storage system as claimed in claim 10, wherein the contactless power charging system further includes a second capacitor connected in parallel to the secondary core unit.

13. The energy storage system as claimed in claim 12, wherein the contactless power charging system further includes a rectifying unit, the rectifying unit being configured to rectify power transmitted from the secondary core unit and to transmit the rectified power to the load.

14. The energy storage system as claimed in claim 9, wherein the secondary core unit is on the electrical moving object.

15. The energy storage system as claimed in claim 10, wherein the inverter has a full-bridge structure including at least 4 switching elements.

16. An energy storage system, comprising:
a maximum power point tracking (MPPT) converter configured to convert power generated by a photovoltaic power generation system and to output the converted power to a first node;
a bidirectional inverter connected between the first node and a second node to which a grid and a load are connected, the bidirectional inverter being configured to:
convert a first power input through the first node into a second power and output the second power to the second node, and
convert power supplied from the grid into the first power and output the first power to the first node;
a battery configured to store a third power;
a bidirectional converter connected between the battery and the first node, the bidirectional converter being configured to:
convert the third power output from the battery into the first power and output the first power to the bidirectional inverter through the first node, and
convert the first power output through the first node from the bidirectional inverter into the third power and store the third power in the battery;
an inverter configured to convert the third power stored in the battery into a fourth power;
a primary core unit configured to transmit the fourth power to a battery of an electrical moving object in a contactless manner, the electrical moving object including a secondary core unit; and
an integrated controller configured to control power conversion of the MPPT converter, the bidirectional inverter, the bidirectional converter, and the inverter.

17. The energy storage system as claimed in claim 16, wherein:
the primary core unit includes a first base portion, a projecting portion projecting from the first base portion, and a primary coil wound around the projecting portion, and
the secondary core unit includes a second base portion, a concave portion in the second base portion to receive the projecting portion, and a secondary coil on an inner surface of the concave portion, the secondary coil being configured to couple to the primary coil.

18. The energy storage system as claimed in claim 17, further comprising a first capacitor connected between the inverter and the primary core unit and connected in series to the primary core unit, wherein the electrical moving object further includes a second capacitor connected in parallel to the secondary core unit.

19. The energy storage system as claimed in claim 18, wherein the electrical moving object further includes a rectifying unit, the rectifying unit being configured to rectify power transmitted from the secondary core unit and to transmit the rectified power to the battery.

* * * * *